(12) United States Patent
Meyer et al.

(10) Patent No.: US 9,884,680 B2
(45) Date of Patent: Feb. 6, 2018

(54) ELASTOMERIC BEARING SYSTEM MOTION LIMITER

(75) Inventors: Leon M. Meyer, Harwinton, CT (US);
Richard C. Lay, Harwinton, CT (US);
David N. Schmaling, Southbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1073 days.

(21) Appl. No.: 13/139,015

(22) PCT Filed: Dec. 11, 2008

(86) PCT No.: PCT/US2008/086365
§ 371 (c)(1),
(2), (4) Date: Jun. 10, 2011

(87) PCT Pub. No.: WO2010/068209
PCT Pub. Date: Jun. 17, 2010

(65) Prior Publication Data
US 2011/0243731 A1    Oct. 6, 2011

(51) Int. Cl.
| | | |
|---|---|---|
| *F01D 5/30* | (2006.01) | |
| *B64C 27/33* | (2006.01) | |
| *B64C 27/35* | (2006.01) | |

(52) U.S. Cl.
CPC .............. *B64C 27/33* (2013.01); *B64C 27/35* (2013.01)

(58) Field of Classification Search
CPC  F01D 5/30; B64C 27/33; B64C 27/35; B64C 27/48
USPC ........ 416/134 R, 134 A, 140, 141, 148, 149, 416/150, 168 R
See application file for complete search history.

(56) References Cited

U.S. PATENT DOCUMENTS

| | | | |
|---|---|---|---|
| 2,078,411 A * | 4/1937 | Richardson | 411/113 |
| 2,841,030 A | 7/1958 | Wrighton | |
| 2,992,568 A | 7/1961 | Benkovsky et al. | |
| 3,277,738 A | 10/1966 | Glauser et al. | |
| 3,299,933 A * | 1/1967 | Akashi | F16B 37/14 29/511 |
| 3,599,507 A | 8/1971 | Exton | |
| 3,700,352 A | 10/1972 | Gorndt | |
| 4,008,980 A | 2/1977 | Noehren et al. | |
| 4,047,839 A | 9/1977 | Ferris et al. | |
| 4,053,258 A * | 10/1977 | Mouille | 416/134 A |
| 4,087,203 A | 5/1978 | Ferris | |
| 4,093,400 A | 6/1978 | Rybicki | |

(Continued)

FOREIGN PATENT DOCUMENTS

WO        0017047        3/2000

OTHER PUBLICATIONS

Supplementary European Search Report for European Patent Application No. 08878810.4 dated May 27, 2013.

(Continued)

*Primary Examiner* — Logan Kraft
*Assistant Examiner* — Joshua R Beebe
(74) *Attorney, Agent, or Firm* — Carlson, Gaskey & Olds, P.C.

(57) ABSTRACT

The invention relates to a backing plate used for an elastomeric bearing system, the backing plate comprising a plate which defines an at least partial annulus about an axis, a motion limiter and a redundant pivot which extend from the plate so as to respond to a retainer plate disbond.

12 Claims, 7 Drawing Sheets

(56) References Cited

U.S. PATENT DOCUMENTS

| | | | |
|---|---|---|---|
| 4,105,266 A | 8/1978 | Finney | |
| 4,170,147 A | 10/1979 | Durno et al. | |
| 4,178,130 A | 12/1979 | Ferris et al. | |
| 4,198,877 A | 4/1980 | Huling | |
| 4,244,677 A * | 1/1981 | Noehren et al. | 416/134 A |
| 4,332,525 A | 6/1982 | Cheney, Jr. | |
| 4,345,876 A | 8/1982 | Schwarz et al. | |
| 4,381,902 A | 5/1983 | Head et al. | |
| 4,427,340 A | 1/1984 | Metzger et al. | |
| 4,449,053 A * | 5/1984 | Kutcher | 290/44 |
| 4,529,155 A | 7/1985 | Bramwell et al. | |
| 4,539,807 A * | 9/1985 | Stahlecker | D01H 4/16 57/401 |
| 4,547,127 A | 10/1985 | Frommlet et al. | |
| 4,676,720 A * | 6/1987 | Niwa et al. | 416/134 A |
| 4,690,616 A | 9/1987 | Hahn et al. | |
| 4,695,227 A | 9/1987 | Head et al. | |
| 4,714,450 A | 12/1987 | Byrnes et al. | |
| 4,729,753 A * | 3/1988 | Neathery | B64C 27/35 416/102 |
| 4,746,272 A | 5/1988 | Noehren et al. | |
| 4,754,958 A * | 7/1988 | Markowski | 267/140 |
| 4,776,543 A | 10/1988 | Stableford | |
| 4,893,988 A | 1/1990 | Sato | |
| 4,898,515 A | 2/1990 | Beno et al. | |
| 4,975,021 A | 12/1990 | Wagner et al. | |
| 4,988,084 A | 1/1991 | Wagner et al. | |
| 5,092,738 A | 3/1992 | Byrnes et al. | |
| 5,110,260 A | 5/1992 | Byrnes et al. | |
| 5,129,281 A | 7/1992 | Van Zanten et al. | |
| 5,149,013 A | 9/1992 | Costanzo et al. | |
| 5,188,513 A | 2/1993 | Byrnes | |
| 5,263,821 A | 11/1993 | Noehren et al. | |
| 5,301,563 A | 4/1994 | Van Zanten et al. | |
| 5,340,279 A | 8/1994 | Cycon et al. | |
| 5,449,152 A | 9/1995 | Byrnes et al. | |
| 5,460,487 A * | 10/1995 | Schmaling | B64C 27/35 267/140.2 |
| 5,478,204 A * | 12/1995 | Desjardins et al. | 416/168 R |
| 5,538,209 A | 7/1996 | Bowden et al. | |
| 5,549,440 A * | 8/1996 | Cholakon et al. | 414/723 |
| 5,607,122 A | 3/1997 | Hicks et al. | |
| 5,690,193 A | 11/1997 | Baumann et al. | |
| 5,749,449 A | 5/1998 | Kearney et al. | |
| 5,788,462 A | 8/1998 | Legendre et al. | |
| 5,913,659 A * | 6/1999 | Doolin et al. | 416/107 |
| 5,924,331 A | 7/1999 | Pohling | |
| 5,987,703 A * | 11/1999 | Kluting | E05D 5/121 16/262 |
| 6,024,325 A | 2/2000 | Carter, Jr. | |
| 6,045,328 A * | 4/2000 | Jones | F16F 13/105 248/562 |
| 6,113,352 A | 9/2000 | Georges et al. | |
| D455,113 S | 4/2002 | Sehgal et al. | |
| 6,371,681 B1 * | 4/2002 | Covington et al. | 403/158 |
| 6,848,886 B2 | 2/2005 | Schmaling et al. | |
| 2003/0235499 A1 * | 12/2003 | Schmaling | 416/134 A |
| 2004/0208745 A1 * | 10/2004 | Schmaling | B64C 27/35 416/134 A |

OTHER PUBLICATIONS

International Search Report and Written Opinion, dated Sep. 9, 2009, PCT/US2008/086365.

Extended European Search Report for European Patent Application No. 08878810.4 completed on May 16, 2013.

* cited by examiner

ELASTOMERIC BEARING SYSTEM MOTION LIMITER

BACKGROUND

The present application relates to an elastomeric bearing system, and more particularly to a mount system therefor.

Flexbeam main rotor and tail rotor blade systems utilize resilient elastomeric bearings between a flexbeam and a surrounding torque tube. The elastomeric bearings position the torque tube relative the flexbeam to permit the blade to pitch, flap, lead, and lag.

The elastomeric bearings are typically referred to as snubber/dampers which include vertically stacked arrangements of spherical and flat elastomeric laminates. The spherical bearing "snubber" accommodates pitch change and flapping rotation while the flat layers accommodate lead/lag linear motions and some radial spanwise motion. The snubber/dampers are located between the flexbeam and the torque tube under a preload so that the elastomer laminates thereof remain in compression throughout the full range of articulation. The snubber/dampers are often mounted through an opening in the torque tube for attachment to a retainer plate which is bonded to the flexbeam.

Conventional elastomeric bearings may fail in response to a retainer plate disbond. After a retainer disbond, the elastomeric bearings are pulled outboard by a combination of centrifugal force and bearing preload along the sloped flexbeam. The outboard displacement is such that contact between the elastomeric bearing and the surrounding hardware may result in damage to the elastomeric bearing, the flexbeam and the torque tube.

SUMMARY

A backing plate according to an exemplary aspect of the present invention includes a plate which defines an at least partial annulus about an axis, a motion limiter and a redundant pivot which extend from the plate generally parallel to the axis.

A tail rotor blade assembly according to an exemplary aspect of the present application includes a flexbeam and a torque tube defined at least partially around the flexbeam. A retainer mounted to the flexbeam. An elastomeric bearing having an inner race and an outer race defined along an axis, the inner race mountable to the retainer. A backing plate mountable to the outer race, the torque tube between the backing plate and the outer race.

A method to minimize outboard movement of a tail rotor blade assembly elastomeric bearing in response to a retainer disbond condition according to an exemplary aspect of the present application includes stopping an outboard movement of the elastomeric bearing due to centrifugal loading through contact between a motion limiter and the elastomeric bearing in response to an at least partial retainer disbond condition.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
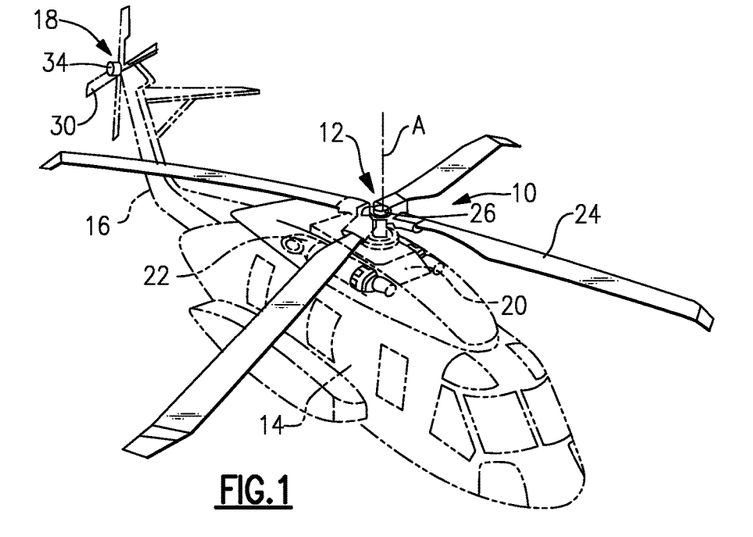
FIG. 1 is a general perspective view of an exemplary rotary wing aircraft embodiment for use with the present invention.

FIG. 1 schematically illustrates a rotary-wing aircraft 10 having a main rotor system 12. The aircraft 10 includes an airframe 14 having an extending tail 16 which mounts an anti-torque system 18. The main rotor assembly 12 is driven about an axis of rotation A through a main rotor gearbox (MGB) 20 by a multi-engine powerplant system 22. The multi-engine powerplant system 22 powers the MGB 20 to drive the main rotor assembly 12 and the anti-torque system 18. The main rotor system 12 includes a multiple of rotor blade assemblies 24 mounted to a rotor hub 26. The anti-torque system 18 includes a multiple of tail rotor blade assemblies 30 mounted to a tail rotor hub 34. Although a particular helicopter configuration is illustrated and described in the disclosed embodiment, other configurations and/or machines, such as high speed compound rotary-wing aircraft with supplemental translational thrust systems, dual contra-rotating, coaxial rotor system aircraft, turbo-props, tilt-rotors and tilt-wing aircraft, will also benefit herefrom.

Figure 2A:
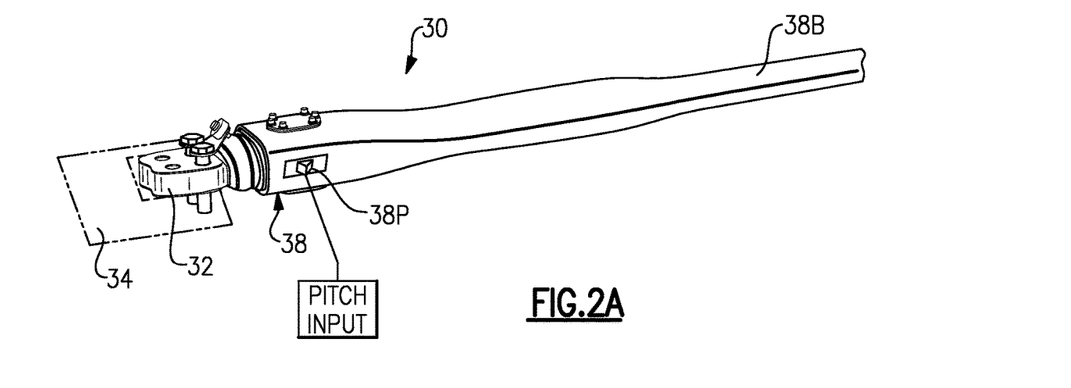
FIG. 2A is an expanded perspective view of a tail rotor blade assembly.

Referring to FIG. 2A, each tail rotor blade assembly 30 of the anti-torque system 18 generally includes a flexbeam 32 which mounts to the tail rotor hub 34. A torque tube 38 at least partially envelopes the flexbeam 32. The torque tube 38 mounts or is integral with a tail rotor blade airfoil 38B to accommodate blade flap and pitch change motion into the blade assembly 30 through deflection of the flexbeam 32.

Pitch change to each blade assembly 30 may be input through a pitch horn 38P mounted to the torque tube 38 to cause the blade assembly 30 to pitch about a feathering axis. It should be understood that although the description will make reference to but a single blade assembly 30, such description is applicable to each blade assembly 30 of the anti-torque system 18. It should also be understood that although a particular tail rotor system is illustrated in the disclosed embodiment, other main and tail rotor systems as well as other elastomeric bearing mounts will benefit herefrom.

Figure 2B:
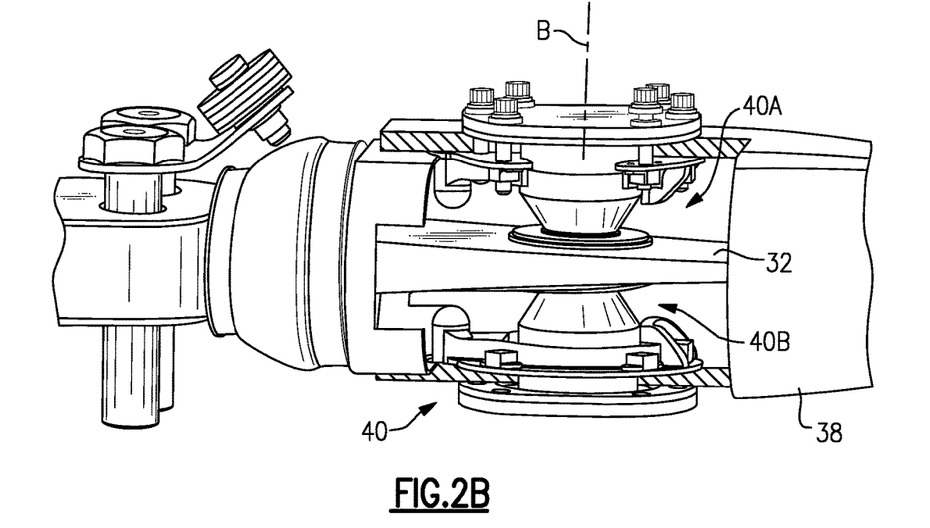
FIG. 2B is an expanded partial phantom view of the tail rotor blade assembly of FIG. 2A.

Referring to FIG. 2B, an elastomeric bearing system 40 is mounted to the torque tube 38 and the flexbeam 32 to support the torque tube 38 with respect to the flexbeam 32. The elastomeric bearing system 40 transfers push rod loads from the pitch horn 38P (FIG. 2A) through the torque tube 38 and into the flexbeam 32. The elastomeric bearing system 40 includes an upper elastomeric bearing system 40A and a lower elastomeric bearing system 40B defined along a bearing axis B with the flexbeam 32 located therebetween. Although the description herein is directed to the upper elastomeric bearing system 40A, the description is also applicable to the lower elastomeric bearing system 40B.

Figure 2C:
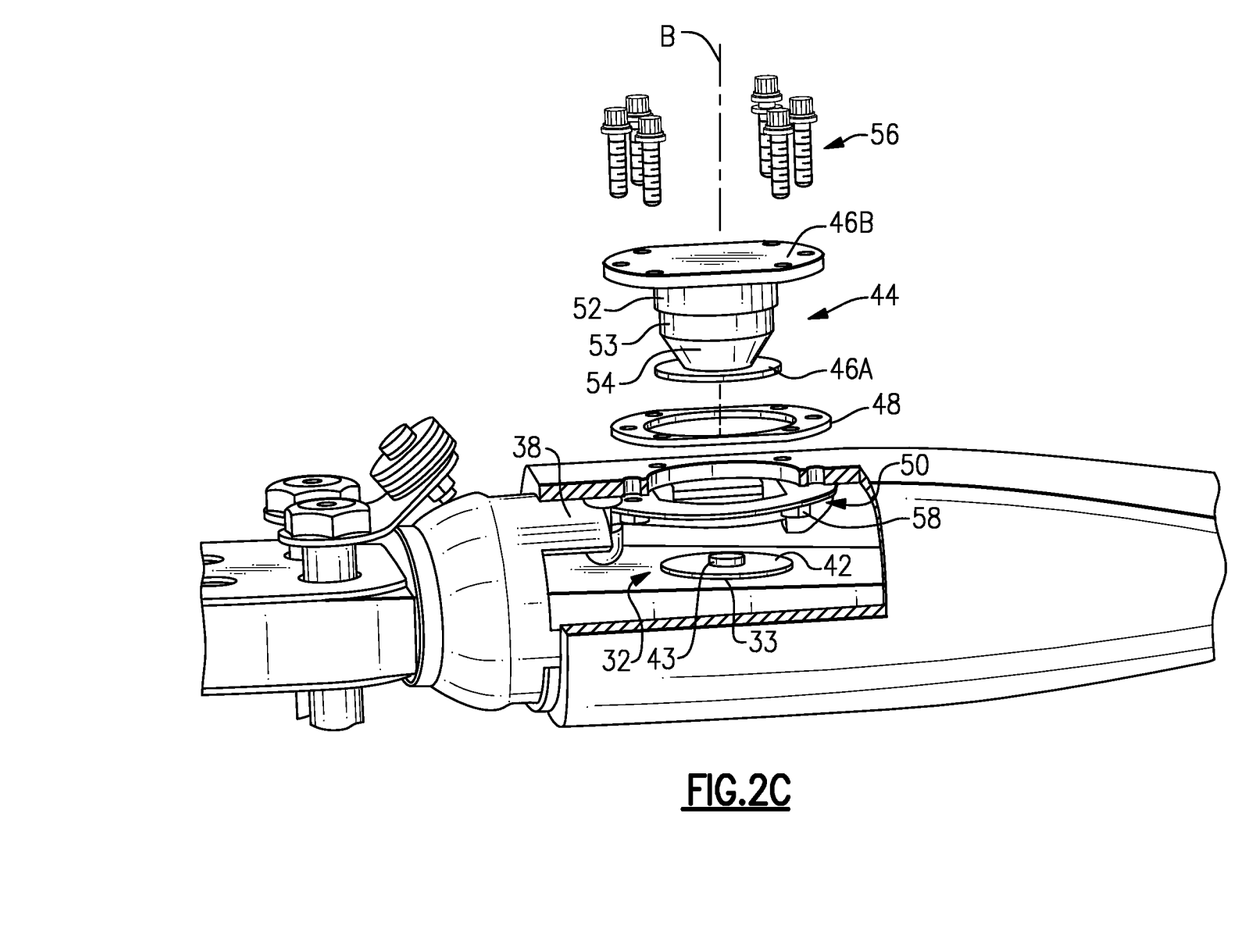
FIG. 2C is an exploded view of the tail rotor blade assembly of FIG. 2A.

Referring to FIG. 2C, the elastomeric bearing system 40A generally includes a retainer 42, an elastomeric bearing 44 which has an inner race 46A and outer race 46B, a spacer 48 and a backing plate 50 defined along a bearing axis B. The inner race 46A is of a generally spherical shape and the outer race 46B is of a generally planar plate shape. The elastomeric bearing 44 includes an outer damper portion 52 and inner snubber portion 54 which may be of the elastomeric bearing type having a stack of alternate layers of elastomer laminates and rigid laminates sandwiched together and bonded between the inner race 46A and the outer race 46B.

Figure 3:
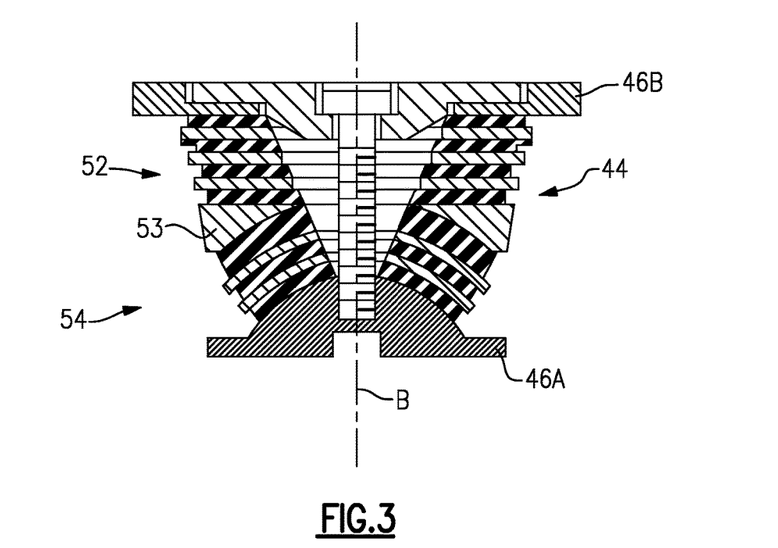
FIG. 3 is a sectional view of an elastomeric bearing for use within a tail rotor blade assembly.

The outer damper portion 52 is a cylindrically shaped elastomeric bearing with generally flat laminates to accommodate in-plane, lead-lag motions. The inner snubber portion 54 is a generally spherical elastomeric bearing with generally semi-spherical laminates concentric about a point on the blade feathering axis so as to accommodate blade pitch and flap change. A rigid transition layer 53 is located between the outer damper portion 52 and the inner snubber portion 54 (FIG. 3).

The retainer 42 is mounted to the flexbeam 32 through an adhesive bond 33 or other attachment method which provides an attachment therebetween. The retainer 42 includes a stud 43 which is engageable with the inner race 46A so as to facilitate a readily field replaceable elastomeric bearing 44.

The spacer 48 is located between the outer race 46B and the torque tube 38. The spacer 48 shims any potential gap between the outer race 46B and the torque tube 38 to accommodate potential manufacture tolerance so that the elastomeric bearing 44 is properly loaded in compression.

Figure 4A:
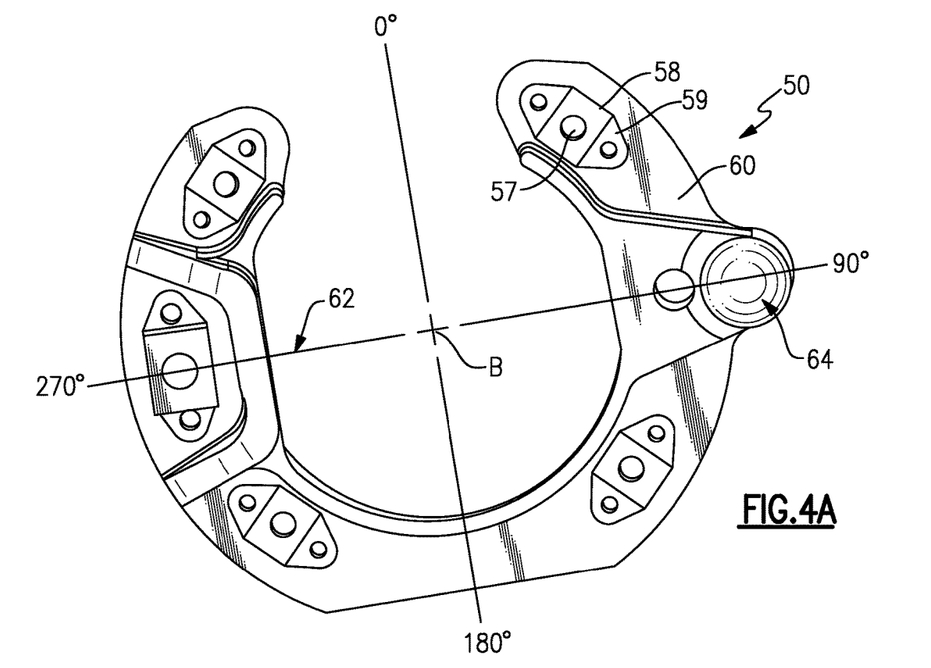
FIG. 4A is a bottom view of a backing plate according to one non-limiting embodiment of the present invention.

The outer race 46B is mounted to the torque tube 38 by fasteners 56, 58 such as a bolt 56 and nut 58 arrangement so as to readily attach outer race 46B to the torque tube 38. The nuts 58 may be mounted to the backing plate 50 within cages 59 such that the nuts 58 remain therewith adjacent a respective aperture 57 formed therethrough (FIG. 4A). The bolts 56 are received through the outer race 46B, the spacer 48 and the torque tube 38 to engage the nuts 58 on the backing plate 50 and thereby clamp the elastomeric bearing 44 in a precompressed state.

Figure 4B:
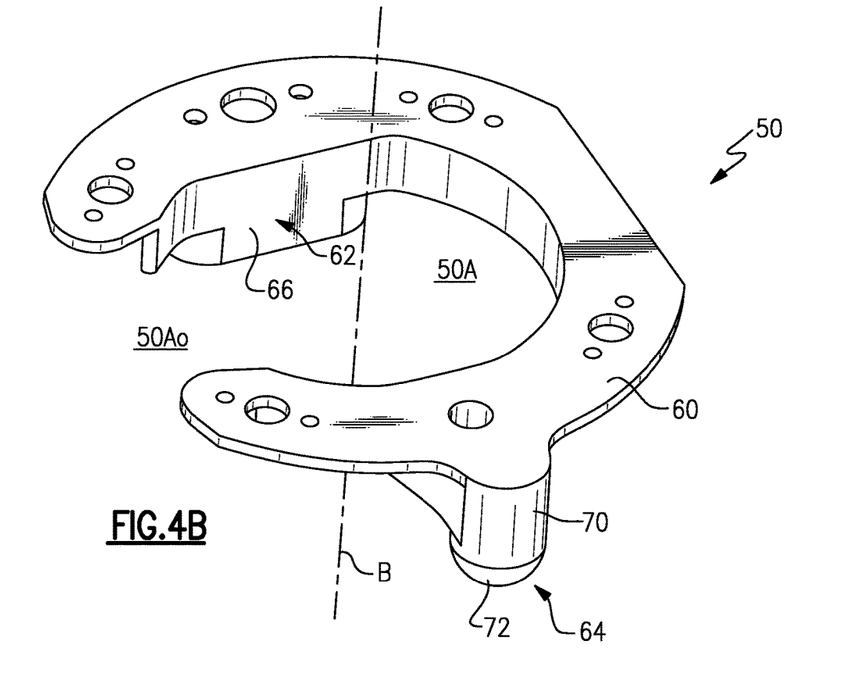
FIG. 4B is a top perspective view of the backing plate according to one non-limiting embodiment of the present invention.
Figure 4C:
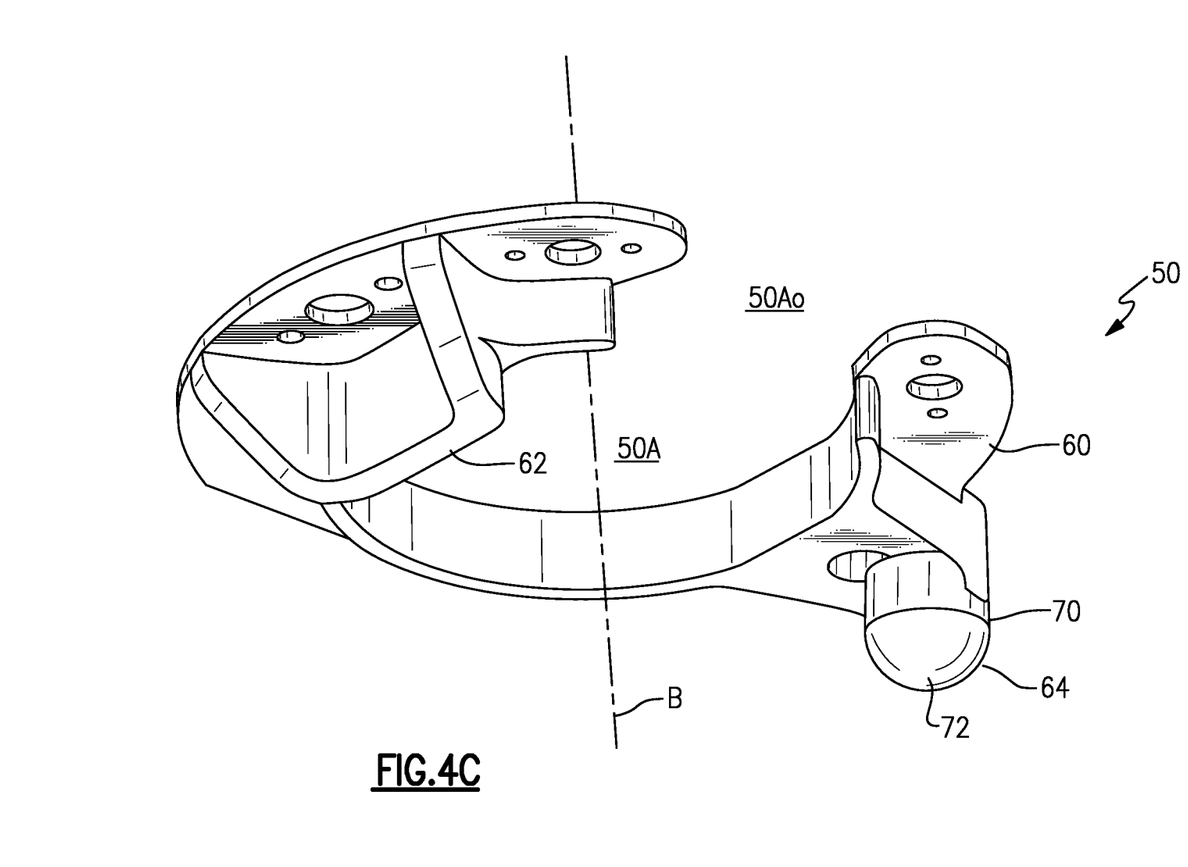
FIG. 4C is a bottom perspective view of the backing plate according to one non-limiting embodiment of the present invention.
Figure 5:
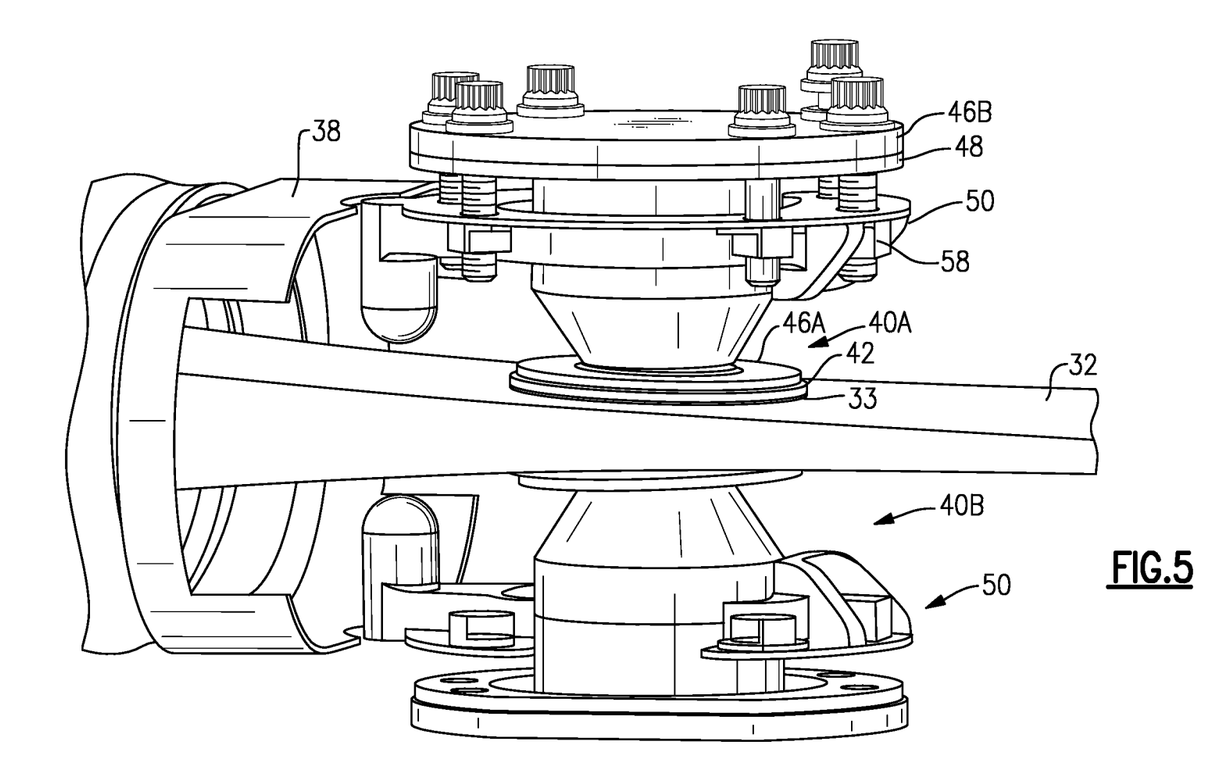
FIG. 5 is an expanded partial phantom view of the tail rotor blade assembly of FIG. 2A in one flight position.

Referring to FIGS. 4A-4C, the backing plate 50 is a generally semi-annular or "C" shaped plate 60 having a motion limiter 62 and a redundant pivot 64 which extend from the plate 60 about a partial annulus 50A. It should be understood that the term "plate" as utilized herein is not to be limited to only a completely flat member but any member that may include various ribs, features and other contours, structural and otherwise, yet still able to abut another surface. The partial annulus 50A allows assembly of the backing plate 50 through openings in the torque tube 38 and about the elastomeric bearing system 42A so as to facilitate installation (FIG. 5). The multiple of apertures 57 are located through the plate 60 about the partial annulus 50A.

The motion limiter 62 is generally opposite the redundant pivot 64, in that the motion limiter 62 is spaced 180 degrees away from the redundant pivot 64 with an annulus radial opening $50A_O$ therebetween. In one non-limiting embodiment, the annulus radial opening $50A_O$ is located generally at zero degrees, the motion limiter 62 is located generally at 90 degrees and the redundant pivot 64 is located generally at 270 degrees.

The backing plate 50 facilitates flight operations and maintains the structural integrity of the tail rotor. The motion limiter 62 operates to decrease deterioration of the elastomeric bearing 44 once the adhesive bond 33 between the retainer 42 and the flexbeam 32 have at least partially failed while the redundant pivot 64 controls motion between the flexbeam 32 and the torque tube 38 should significant failure occur. The redundant pivot 64 also generally permits sufficient motion to create warning vibrations to indicate that the elastomeric bearing 44 may require replacement.

The motion limiter 62 is outboard relative the redundant pivot 64 and extends generally parallel to the bearing axis B to define a wall 66 generally transverse to the plate 60 and inboard relative to the annulus 50A. The redundant pivot 64 includes a cylinder 70 with a semi-spherical end section 72 to accommodate pitch change, flapping and lead-lag motions of the flexbeam 32 without contact during normal flight operations. The motion limiter 62 and the redundant pivot 64 do not make contact with any other component during normal flight operations (FIG. 5).

Figure 6:
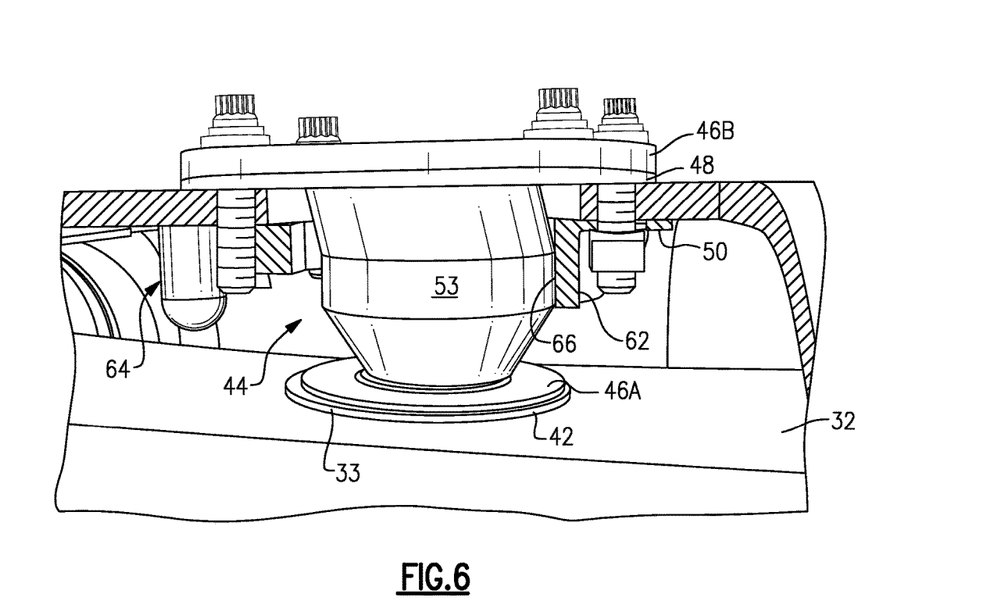
FIG. 6 is an expanded partial phantom view of the backing plate with a motion limiter that stops the outboard creep of an elastomeric bearing due to centrifugal loading of a tail rotor blade assembly.

Referring to FIG. 6, the backing plate 50 provides both a preventative feature and a fail-safe feature which facilitates less frequent inspection intervals, provide redundant flight operations after failure and avoid secondary damage to the blade structure. The wall 66 of the motion limiter 62 operates as a bumper surface specifically located in an outboard position to allow normal motion of the elastomeric bearing 44 during normal flight operations yet provide restraint should the retainer 42 begin to disbond and if the elastomeric bearing 44 experiences extreme deflection. If the adhesive bond 33 between the retainer 42 and the flexbeam 32 fails, the motion limiter 62 minimizes the outboard creep of the elastomeric bearing 44 due to centrifugal loading. The wall 66 of the motion limiter 62 is located to provide a contact surface with the rigid transition layer 53.

Figure 7:
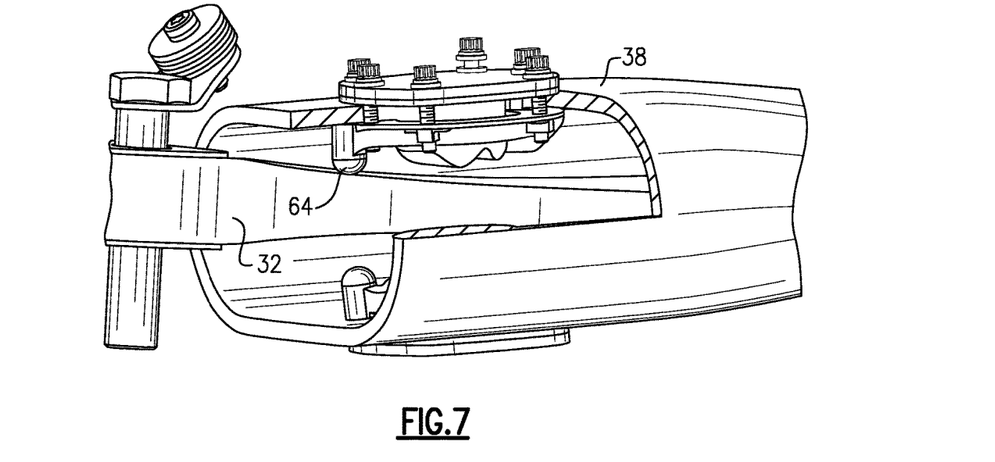
FIG. 7 is an expanded partial phantom view of the backing plate with a redundant pivot that limits vertical motion of a torque tube relative a flexbeam in a tail rotor blade assembly.

Referring to FIG. 7, in the event of a significant elastomeric bearing 44 failure, the redundant pivot 64 limits vertical motion of the torque tube 38 relative the flexbeam 32. The redundant pivot 64 need only function if the adhesive bond 33 between the retainer 42 and the flexbeam 32 fails and the motion limiter 62 is unsuccessful. The redundant pivot 64 limits vertical motion of the torque tube 38 even if the elastomeric bearing 44 becomes completely detached. This facilitates failsafe operation of the elastomeric bearing system 40.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed is:

1. A tail rotor blade assembly comprising:
a flexbeam;
a torque tube defined at least partially around said flexbeam;
a retainer mounted to said flexbeam;
an elastomeric bearing having an inner race and an outer race defined along an axis, said inner race mounted to said retainer, wherein said elastomeric bearing includes an outer damper portion adjacent said outer race, an inner snubber portion adjacent said inner race, and a rigid transition layer between said outer damper portion and said inner snubber portion;
a backing plate mountable to said outer race, said torque tube between said backing plate and said outer race;
wherein said backing plate includes a redundant pivot generally opposite a motion limiter;
wherein said motion limiter is outboard of said redundant pivot; and
wherein a surface of said rigid transition layer contacts a wall of said motion limiter in a retainer disbond condition.

2. The assembly as recited in claim 1, wherein the inner race is spherical in shape and the outer race is a planar plate shape.

3. The assembly as recited in claim 2, wherein the inner snubber portion includes concentric semi-spherical laminates to accommodate blade pitch and flap change.

4. The assembly as recited in claim 2, wherein the outer damper portion includes generally flat laminates to accommodate in-plane, lead-lag motions.

5. The assembly as recited in claim 1, wherein said plate defines an annulus radial opening located generally at zero degrees, said motion limiter located generally at 90 degrees and said redundant pivot located generally at 270 degrees.

6. The assembly as recited in claim 1, wherein said redundant pivot includes a cylinder with a semi-spherical end section.

7. A tail rotor blade assembly comprising:
a backing plate comprising:
a plate which defines an at least partial annulus about an axis;
a motion limiter which extends from said plate generally parallel to said axis;
a redundant pivot which extends from said plate generally parallel to said axis;
wherein said plate defines an annulus radial opening located generally at zero degrees, said motion limiter located generally at 90 degrees, and said redundant pivot located generally at 270 degrees; and
an elastomeric bearing comprising:
an inner race and an outer race defined along an axis, wherein the inner race is spherical in shape and the outer race is a planar plate shape, and wherein said plate is attached to said outer race;
an outer damper portion adjacent said outer race, wherein the outer damper portion includes generally flat laminates;
an inner snubber portion adjacent said inner race, wherein the inner snubber portion includes semi-spherical laminates; and
a rigid transition layer between said outer damper portion and said inner snubber portion, wherein a surface of said rigid transition layer contacts a wall of said motion limiter in a retainer disbond condition.

8. The backing plate as recited in claim 7, wherein said plate is semi-annular.

9. The backing plate as recited in claim 8, wherein said plate defines a "C" shape.

10. The backing plate as recited in claim 7, wherein said redundant pivot includes a cylinder with a semi-spherical end section.

11. The backing plate as recited in claim 7, wherein said plate defines a plurality of apertures about said axis.

12. The backing plate as recited in claim 11, further comprising a nut cage adjacent each of said multiple of apertures.

* * * * *